Dec. 14, 1965  T. J. CARPENTER  3,223,874
PREIONIZER FOR USE IN OVERVOLTAGE PROTECTIVE DEVICES
Filed Dec. 13, 1963
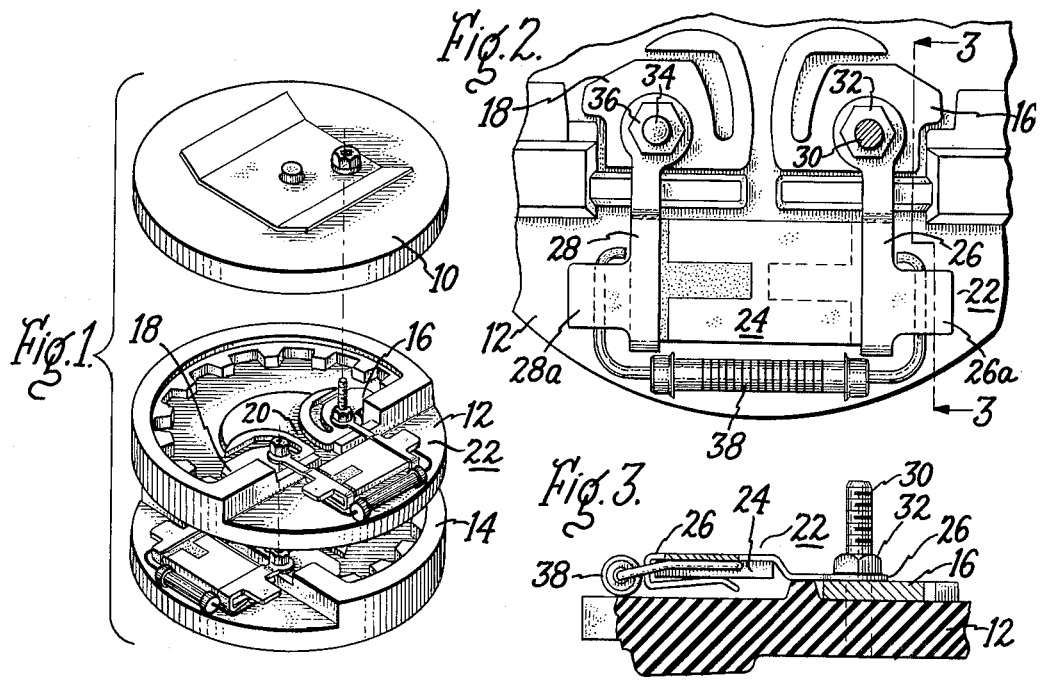
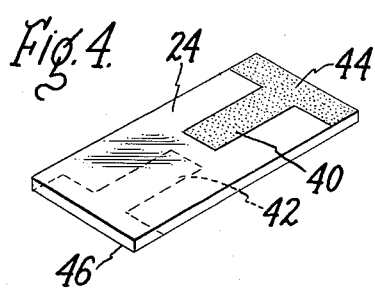
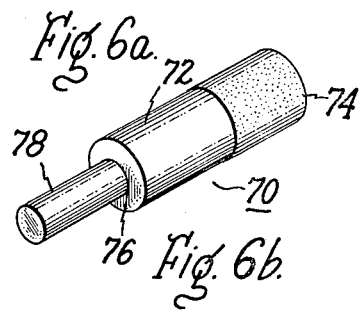
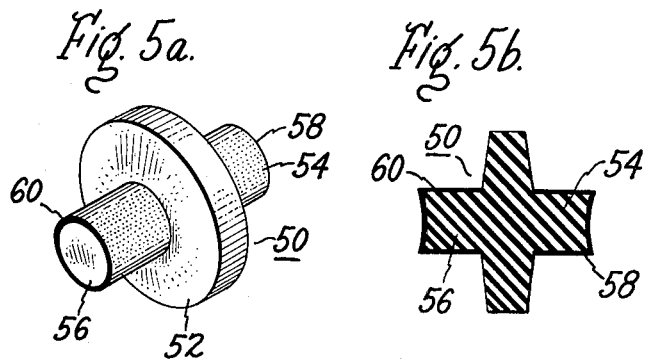
Inventor,
Thomas J. Carpenter,
by Francis K. Doyle
His Attorney.

United States Patent Office 3,223,874
Patented Dec. 14, 1965

3,223,874
PREIONIZER FOR USE IN OVERVOLTAGE PROTECTIVE DEVICES
Thomas J. Carpenter, Pittsfield, Mass., assignor to General Electric Company, a corporation of New York
Filed Dec. 13, 1963, Ser. No. 330,309
4 Claims. (Cl. 313—231)

This invention relates to overvoltage protective devices and, more particularly, to a preionizer for use in such overvoltage protective devices.

As is well known, overvoltage protective devices such as lightning arresters, and the like, generally comprise a plurality of gaps in series with a number of valve elements. Under overvoltage conditions the gaps are arced over, diverting the surge to ground through the valve elements. After the overvoltage surge has been drained to ground, the valve elements and gaps interrupt the power follow current. This operation of overvoltage protective devices is well understood by those skilled in the art.

In various types of overvoltage protective devices, it is also well known to provide preionizers in some or all of the gaps. The preionizers help to break down the gaps at the desired impulse voltage level in a consistent manner. This is necessary since the inherent voltage sparkover values of the gaps of an overvoltage protective device are a function of the wave front of the transient overvoltage and are erratic. The preionizer provides a consistent gap sparkover by producing a radiation which ionizes the gaseous dielectric of the gaps of the overvoltage protective device. In general, preionizers are electrically connected in parallel with the gaps and are provided with a high impedance to limit the preionizer current to a low value, insuring that the surge discharge current will pass across the series gaps.

As is well understood, the voltage level at which preionizers become effective must be above the rated operating voltage of the overvoltage protective device to eliminate radio noise. Further, the radiation produced can cause corrosion of the various elements of the overvoltage protective device and, if produced at rated voltage, may rapidly cause failure of the elements of the overvoltage protective device.

Present day preionizers, such as disclosed in Patent No. 2,922,914, are usually effective in meeting these requirements. However, presently available preionizers either require a spaced air gap which must be very accurately set and maintained or else provide for the use of a dielectric spacer as in Patent No. 2,392,679. The various types of air gaps are usually only obtained at relatively high cost and in many instances it is difficult to maintain the desired space. Further, the air gaps are usually subjec to damage during assembly due to the fragile nature of the material forming the air gap. The use of dielectric spacers generally requires a plurality of parts which increases the expense of the preionizer and, in general, is not suited to production line techniques due to the difficulty in reproducing the same electrical characteristics from preionizer to preionizer. From the above it is apparent that there is still a great need in the art of overvoltage protective devices for a relatively simple, low cost preionizer which can be manufactured in quantity with the same electrical characteristics.

It is, therefore, one object of this invention to provide a new and novel preionizer for an overvoltage protective device.

A further object of this invention is to provide a novel preionizer which does not require the use of an air gap.

A still further object of this invention is to provide a simple, inexpensive preionizer.

Yet another object of this invention is to provide a simple preionizer which can be quantity produced with substantially identical electrical characteristics.

Briefly, this invention in one form provides a novel preionizer for use with overvoltage protective devices to ionize the series gaps of such devices to cause a consistent sparkover at desired impulse levels of transient overvoltages. The preionizer is formed as an integral body member made from an insulating composition. Electrodes are provided, secured to the body member and form a gap between the electrodes. The gap formed between the electrodes is completely filled by a portion of the body member. Contacts are provided on the electrodes for connecting the preionizer in electrical shunt with the series gaps of the overvoltage protective device.

The invention which is sought to be protected will be particularly pointed out and distinctly claimed in the claims appended hereto. However, it is believed that the invention and the manner in which its various objects and advantages are obtained, as well as other objects and advantages thereof, will be better understood by reference to the following detailed description of various preferred embodiments thereof, particularly when considered in the light of the accompanying drawing, in which:

FIGURE 1 is an exploded perspective view of a gap unit of an overvoltage protective device showing the use of one form of preionizer according to this invention;

FIGURE 2 is an enlarged top view of a portion of the gap unit of FIG. 1, showing the form of preionizer in greater detail;

FIGURE 3 is a sectional view taken on the line 3—3 of FIG. 2;

FIGURE 4 is a perspective view of the form of preionizer shown in FIGS. 1 through 3;

FIGURES 5a and 5b are, respectively, a perspective and sectional view of another form of preionizer according to this invention; and FIGURES 6a and 6b are, respectively, a perspective and sectional view of another form of preionizer according to this invention.

Reference will now be made to the drawing in which like numerals are used to indicate like parts throughout the various views thereof. Referring first to FIG. 1, there is shown an exploded perspective view of a gap unit of an overvoltage protective device. The gap unit comprises a plurality of plate members, indicated at 10, 12 and 14. The plate members may be made of any desired insulating material, such as for example the porous insulating material which is described and claimed in application Serial No. 162,382, now Patent No. 3,151,273 for "Current Limiting Lightning Arrester With Porous Gap Structure," filed December 27, 1961, in the names of James H. Snell, Jr., and Earl W. Stetson and which is assigned to the same assignee as this invention. In the manner more clearly disclosed in Application Serial No. 162,382 the plate members 10, 12 and 14 are designed to nest together to provide an effective gap unit having arcing chambers between plates 10 and 12 and between plates 12 and 14. As can be seen from FIG. 1 of the drawing, a pair of gap electrodes 16 and 18 are provided on plate member 12, and, as will be apparent, a similar pair of gap electrodes are provided on plate member 14. A gap 20 is formed between the electrodes 16 and 18 and it is this gap which is desired to be ionized by the preionizer of this invention. As is shown in FIG. 1, a preionizer indicated at 22 is mounted on the plate member 12 and is secured in parallel circuit relation with the gap electrodes 16 and 18. The means of connecting and mounting the preionizer 22 may be better understood from FIGS. 2 and 3 of the drawing.

As is shown in FIGS. 2 and 3, the preionizer 22 comprises a body member 24 provided with contact devices 26 and 28 on opposite ends of the body member 24. The contact member 26 is electrically connected to the gap electrode 16 by means of a bolt or pin member 30 and a nut member 32. In the same fashion, the contact member 28 is secured to the gap electrode 18 by means of the bolt or pin member 34 and the nut member 36. It will be apparent that rivets or other fastening means could be used in place of bolts 30, 34, if desired. As is apparent from FIG. 2 of the drawing, each of the clamp or connecting members 26 and 28 is provided with a tab member which fits around the bolt or pin 30, 34 and the nut member 32 and 36 may be threaded on to bolt member 30, 34 to firmly secure the tab of each of connecting members 26 and 28 in electrical contact with the gap electrodes 16 and 18. A preferred form of the clamp or connecting members 26, 28 is shown more clearly in FIG. 3 of the drawing.

As can be seen from FIG. 3, the clamp or connecting member 26 is comprised of a metallic U-shaped member, preferably of spring steel, which is firmly clipped over one end of the body member 24. The tab portion of 26 is firmly secured by means of bolt 30 and nut 32 to the gap electrode 16. Of course, it will be apparent that other types of connecting members may be utilized; however, it has been found that the clamp member 26 is desirable since it is readily used in assembly line techniques for securely fastening the preionizer 22 in shunt with the gap electrodes.

As is understood by those skilled in the art, it is often desirable to provide a grading resistor in parallel with the gap electrode. One such grading resistor is shown in FIGS. 1, 2 and 3 as a resistor member 38 having its opposite ends connected to tab members 26a, 28a of the contact members 26 and 28, respectively. Preferably, the ends of the resistor 38 are welded or soldered to the tab members 26a and 28a of the contacts 26 and 28. In this manner, the grading resistor 38 is securely connected in parallel circuit with the gap electrodes 16 and 18.

Referring now to FIG. 4 of the drawing, there is shown a perspective view of the form of preionizer which is shown connected in FIGS. 1, 2 and 3. The preionizer 22 comprises a body member 24 which is formed of any desired insulating material, such as for example a ceramic composition, or plastic or mica. The particular composition of the body member 24 will depend in part upon the desired impulse level at which the preionizer is to become operative. Electrode members 40 and 42 are formed on the body member 24, the electrode 40 being formed on the upper surface of body member 24, while electrode 42 is formed on the lower surface of body member 24. The electrodes are preferably formed by means of a conducting material which is coated on the body member 24. For example, the conducting coating may be a conducting paint or silver which will firmly adhere to the body after curing at a given curing temperature. Obviously, the curing temperature will depend upon the type of conducting material used to form the electrodes 40, 42.

As can be seen from FIG. 4, the electrodes 40, 42 are enlarged at their base portions, which are formed at the ends of the body member 24 to form contact members 44 and 46. As is shown, the contact member 44 is formed as an extension of the electrode 40 on the upper surface of the body member 24, while contact 46 is formed on the lower surface as an extension of electrode 44. It will be understood that contact members 44, 46 provide an electrical connection to the contact members 26, 28 of FIG. 2. As will be readily apparent from FIG. 4 of the drawing, a gap is formed between the electrodes 40 and 42, the gap being defined by the portion of body member 24 which separates the electrodes 40, 42. In other words, the gap between the electrodes 40 and 42 is entirely filled by a portion of the body member 24. In this manner, no air gap is provided in the preionizer 22, the gap is solely provided by the insulating material which forms the body member 24. It will be understood that electrodes 40, 42 and their base members 44, 46, respectively, could be formed of metallic members, secured to body member 24 by any known means, if desired. The resulting preionizer would function in the same manner as previously described.

As will be well understood by those skilled in the art, by the preionizer 22 set forth in FIG. 4 of the drawing, a simple, integral preionizer is provided which may be readily manufactured with production line techniques and still will provide for constant electrical characteristics. As will be understood, the electrical characteristics of the gap between electrodes 40 and 42 may be varied by changing the dielectric constant of the material which is used to form the body member 24, or it may be changed by varying the thickness of the insulating body thereby changing the spacing between electrodes 40 and 42. The electrical characteristics may also be changed by varying the spacing between electrodes 40 and 42 by shortening either or both electrodes to thereby provide a longer gap between the electrodes which will be filled with more of the insulating material used to form the body member 24. Thus it is seen that by use of the preionizer set forth that a preionizer will be provided which may be readily manufactured having constant electrical characteristics and that the electrical characteristics may be varied as desired by changing the composition of the body member or the distance between the electrodes 40 and 42.

FIGURES 5a and 5b show another form of the preionizer of this invention. As shown in FIGS. 5a and 5b, the preionizer, indicated at 50, is formed of an insulating material and comprises a disk-like body member 52 having a pair of cylindrical members 54 and 56 extending from opposite sides of the body member 52. Each of the cylindrical members 54 and 56 is coated with a conductive coating to form electrodes 58 and 60. As will be apparent from FIGS. 5a and 5b, a preionizer is provided having electrodes 58 and 60 which are formed on opposite sides of the body member or disk 52. The gap is formed from the inner portion of the electrodes 58 and 60 and is formed solely through the disk member 52. Thus the gap between electrodes 58 and 60 is defined by that portion of the body member 52 which separates the electrodes 58 and 60, or, as previously mentioned, the gap between 58 and 60 is completely filled with a portion of the body member 52. Thus it is seen that a second form preionizer is provided in which the gap is defined by a portion of the body member. Of course it will be understood that each of electrodes 58 and 60 will be provided with clamping members, preferably in the form of the clamping members 26 although, of couse, being cylindrical in form rather than the form shown in FIG. 3, for securing the preionizer 50 to the gap electrodes 16 and 18 in a manner similar to that shown in FIGS. 1 and 2 of the drawing.

Referring now to FIG. 6a and FIG. 6b there is shown, respectively, a perspective and sectional view of a further form of preionizer made according to this invention. In this form of preionizer, indicated as 70, the body member 72 is shown as being cylindrical in form and being made of any desired insulating material. One end of body member 72 is coated with a conducting material forming an electrode 74. The opposite end of the body member 72 is provided with a cavity 76 and a metallic electrode 78 is inserted within the cavity 76 in the manner shown. As will be understood, cavity 76 can be formed in any desired manner, as by drilling or molding. The electrode 78 may be firmly secured within the cavity and should fill the cavity as is indicated in FIGS. 6a and 6b. If desired, and depending upon the insulating material forming the body member 72, the electrode 78 may be secured by a ceramic-to-metal solder or by a resinous material which will form a strong bond between the body member 72 and the electrode 78. As can be seen from FIG. 6b, a gap is formed from the inner end of the electrode 74 and the end of the electrode 78 which is within the body member 72. This gap is again defined by that portion of body member 72 which separates the electrodes 74 and 78. Thus again it can be seen that the gap between electrodes 74 and 78 is completely filled by a portion of the body member 72. Thus it will be apparent that the preionizer 70 shown in FIG. 6 of the drawing will also provide a preionizer for use with an overvoltage protective device which does not require the use of an air gap. If desired, a conducting coating could be placed on the walls of the cavity 76 and the electrode 78 electrically connected thereto. Such conducting coating would form a portion of the electrode 78 and the gap would be formed between the conducting coating and electrode 74, as described above.

Obviously, for both the preionizer of FIG. 5 and the preionizer of FIG. 6, the electrical characteristics can be varied by changing the composition of the body member or by varying the distance between the electrodes by either thickening the body member or by shortening the electrodes. Thus it is seen that all three of the preionizers set forth do provide a preionizer having a pair of electrodes having a gap which is defined by that portion of the body member which separates the electrodes and which may be used with an overvoltage protective device for preionizing the gap of such protective device. Clearly, it will be apaprent from the above description that the preionizer of this invention may be readily manufactured in quantity and be provided with consistent electrical characteristics in such quantity production.

While there has been shown and described the present preferred embodiment of this invention it will, of course, be apparent to those skilled in the art that various changes may be made in the form, shape and size of the preionizer without departing from the spirit and scope of the invention which is set forth in the appended claims.

What is claimed as new and which it is desired to secure by Letters Patent of the United States is:

1. In an overvoltage protective device which has a pair of spaced electrodes defining a discharge gap, a preionizer for ionizing said gap, said preionizer comprising an integral body member of insulating material, a pair of preionizer electrodes adherently secured to said body member, an ionizing gap formed between said preionizer electrodes, said ionizing gap being defined by the portion of said body member which separates said preionizer electrodes, and means electrically connecting said preionizer in parallel circuit with said spaced electrodes.

2. In an overvoltage protective device which has a pair of spaced electrodes defining a discharge gap, a preionizer for ionizing said gap, said preionizer comprising an integral body member of insulating material, a pair of preionizer electrodes adherently secured to said body member, an ionizing gap formed between said preionizer electrodes, said ionizing gap being completely filled by a portion of said body member which extends transversely of said ionizing gap to provide an insulating surface between the preionizer electrodes which is substantially longer than the preionizer gap length through said portion of said body member, and means electrically connecting said preionizer in parallel circuit with said spaced electrodes.

3. In an overvoltage protective device which has a pair of spaced electrodes defining a discharge gap, a preionizer for ionizing said gap, said preionizer comprising an integral body member formed of an insulating material, a pair of preionizer electrodes secured to said body member, said preionizer electrodes formed from conducting material adherently coated on said body member, each of said preionizer electrodes being coated on an opposite side of said body member in non-overlapping relation, an ionizing gap formed between said preionizer electrodes, said ionizing gap being defined by the portion of said body member separating said preionizer electrodes, said portion extending transversely of said ionizing gap to provide an insulating surface between the preionizer electrodes which is substantially longer than the preionizer gap length through said portion of said body member.

4. In an overvoltage protective device which has a pair of spaced electrodes defining a discharge gap, a preionizer for ionizing said gap, said preionizer comprising an integral body member formed of an insulating material, a pair of preionizer electrodes secured to said body member, one of said preionizer electrodes formed from conducting material coated on a portion of said body member, the other of said preionizer electrodes being formed from a metallic member which is secured in a cavity in an opposite portion of said body member, an ionizing gap formed between said preionizer electrodes, said gap being defined by that portion of the body member separating said preionizer electrodes, and means electrically connecting said preionizer in parallel circuit with said spaced electrodes.

References Cited by the Examiner

UNITED STATES PATENTS

| 1,232,467 | 7/1917 | Peek | 313—307 X |
| 1,873,362 | 8/1932 | Tenberg | 313—231 |
| 3,149,263 | 9/1964 | Rabus | 313—231 X |

FOREIGN PATENTS

| 704,980 | 3/1954 | Great Britain. |

JOHN W. HUCKERT, *Primary Examiner.*
DAVID J. GALVIN, A. J. JAMES,
*Assistant Examiners.*